United States Patent
Antoniazzi

(12) 
(10) Patent No.: US 6,702,105 B2
(45) Date of Patent: Mar. 9, 2004

(54) ELASTIC CONVEYOR BELT WITH CONDUCTING FIBERS FOR THE DISCHARGE OF STATIC ELECTRICITY

(76) Inventor: Antonio Antoniazzi, Via Pieve, 46/B, 36072 Chiampo (VI) (IT)

( * ) Notice: Subject to any disclaimer, the term of this patent is extended or adjusted under 35 U.S.C. 154(b) by 0 days.

(21) Appl. No.: 09/991,889

(22) Filed: Nov. 26, 2001

(65) Prior Publication Data

US 2002/0050446 A1 May 2, 2002

Related U.S. Application Data

(63) Continuation-in-part of application No. PCT/EP00/04705, filed on May 24, 2000.

(30) Foreign Application Priority Data

May 27, 1999 (IT) .......................... VI99A00109

(51) Int. Cl.⁷ .................. B65G 15/30; B65G 17/00; B65G 15/34
(52) U.S. Cl. ................... 198/844.1; 198/847
(58) Field of Search ................... 198/715, 844.1, 198/847, 848, 626.4, 626.6; 428/367, 408, 343; 422/313, 408, 187, 208

(56) References Cited

U.S. PATENT DOCUMENTS

| | | | | |
|---|---|---|---|---|
| 3,690,444 A | * | 9/1972 | Chassang | 198/626.6 |
| 3,880,274 A | * | 4/1975 | Bechtloff et al. | 198/626.2 |
| 3,982,626 A | * | 9/1976 | Mehta | 198/626.2 |
| 4,296,855 A | * | 10/1981 | Blalock | 198/847 |
| 4,606,968 A | * | 8/1986 | Thornton et al. | 442/187 |
| 4,839,220 A | * | 6/1989 | Stijntjes et al. | 442/208 |
| 4,889,963 A | * | 12/1989 | Onai | 428/343 |
| 4,951,806 A | * | 8/1990 | Schwing et al. | 198/605 |
| 5,002,178 A | * | 3/1991 | Yamada | 198/847 |
| 5,147,714 A | * | 9/1992 | Ellison et al. | 442/313 |

FOREIGN PATENT DOCUMENTS

| | | |
|---|---|---|
| EP | 368233 | 3/1976 |
| EP | 300176 | 1/1989 |
| GB | 1429718 | 3/1976 |

* cited by examiner

*Primary Examiner*—Gene O Crawford
(74) *Attorney, Agent, or Firm*—Dykema Gossett PLLC

(57) ABSTRACT

A conveyor belt is formed of an elastic fabric which includes elastic conductive fibers. The elastic conductive fibers are formed by helically winding the conductive fibers around elastic yarn forming the elastic fabric.

7 Claims, 2 Drawing Sheets

ELASTIC CONVEYOR BELT WITH CONDUCTING FIBERS FOR THE DISCHARGE OF STATIC ELECTRICITY

CROSS REFERENCE TO RELATED APPLICATIONS

This application is a Continuation-in-Part of PCT/EP00/04705 filed May 24, 2000 in which the United States is designated and which claims priority to Italian Patent Application No. D199A000109 filed May 27, 1999.

ATTACHMENTS

A physical sample of an exemplary embodiment of the invention is attached hereto.

BACKGROUND OF THE INVENTION

The invention relates to an elastic conveyor belt with conducting fibres for the discharge of static electricity.

Conveyor belts with elastic fibres realized with natural or synthetic fibres are used in several productive fields, such as in the packaging or in the field of leathers' processing, but also in many other productive environments, to satisfy some production requirements.

In the leather sector, the perching process is used to give back elasticity and softness to tanned leather after going through various treatments. The perching process consists in beating leather repeatedly and casually with metal pegs, as leather moves through the perching machine compressed between two elastic fabrics.

In this process, it is obvious that the conveyor belt that conveys leather under the perching units must have high elastic properties, to endure the repeated actions of vertical beating that the perching units perform on the conveyor belt and therefore on leather while it passes transversally before coming out of the machine.

Just because of this treatment, leather accumulates static electricity due to the friction between the belt and the same leather and this electricity is the cause of a series of drawbacks.

One of these, is the fact that leathers remain attached to the conveyor belt of the perching machine and are discharged with difficulty.

Moreover leathers that have accumulated static electricity discharge the same on the people who handle them, that is the operators who take them to pass on to successive treatments.

Another drawback may arise because the static electricity of leather is discharged on electronic devices associated with the perching machines, such as stacking units, causing a bad working of said devices.

All these drawbacks remain till now unsolved, for the phenomenon of static electricity, because said static electricity is produced just during the perching operation and is therefore impossible to eliminate static electricity at the source, at least with the existing techniques.

Attempts carried out with the aim of discharging static electricity of the belts through the direct contact of the same conveyor belts with metallic rollers or with brushes connected to the ground, were not successful because of the high quantity of static electricity produced.

EP-A-0368233 discloses a perching machine for the treatment of the leather using two elastic conveyor belts between which the leather is compressed during the perching process. But said belts have not the capability to discharge static electricity.

Moreover the perching process needs a conveyor belt with high extensibility characteristics, together with the capacity to discharge high quantities of static electricity.

What has been heretofore described, is just one of the drawbacks that the known technique cannot solve in the field of transportation of materials involving conveyor belts with elastic fibres.

Actually, there are many sectors, besides tannery, that are registering the above mentioned drawbacks. One of these sectors notably is packaging, where films of synthetic materials or cellophane accumulate a large amount of static electricity and provoke several drawbacks with reference to this matter. The purpose of the invention is to eliminate the just mentioned drawbacks.

SUMMARY OF THE INVENTION

It shall be noted that elastic fabrics with conducting fibres recently appeared as experimental products in the fashion sector where some stylists, with the purpose of reaching peculiar aesthetical and chromatic effects, tried to realize garments, with stretch or not, with carbon, copper, aluminium, silver or gold fibres.

No industrial application is known to the Applicant, above all in the sector of belt conveyors, elasticized fabrics with conducting fibres.

The present invention proposes therefore to transfer from the fashion sector to the industrial sector, and specifically to that of conveyor belts, the technology of elasticized fabrics with fibres made with conducting materials and improved in respect of the elasticity range and the capability to discharge state electricity.

The main object of the invention is therefore to provide an elastic conveyor belt with intrinsic properties able to eliminate the formation and the accumulation of static electricity both in the belt and in the objects transported by the belt itself.

An other object of the present invention is to provide a conveyor belt with conducting fibres having a high extension range capable to follow the high elasticity of the elastic fabric with which the conveyor belt is made.

A further object of the present invention is to provide a conveyor belt having the same properties of discharging electricity independently from the position of the weft or the warp of the fabric in respect of the running direction of the conveyor belt.

It is a further object of the present invention to provide a conveyor belt in which the conducting fibres are displaced in such a way to create a very efficient conducting fibres system, capable to discharge high quantities of static electricity.

An other object of the present invention is to provide a perching machine for the treatment of leather wherein the two conveyor belts between which the leather is submitted to the perching action are capable to discharge all static electricity accumulated in the leather during the perching.

The above objects are achieved according to a preferred embodiment of the present invention by the provision of a conveyor belt, especially a conveyor belt for a perching machine for softening of tanned leather, said conveyor belt being made of elastic fabric, and being provided, in the weft or in the warp of said elastic fabric, with elastic fibres of conducting material able to allow the discharge of static electricity accumulated by the belt, said elastic fibres forming series of lines, crossed in such a way that they form a plurality of meshes.

An aspect of the invention is that said conducting fibres have been made elastic by wounding each of said conducting fibres around the elastic yarns of said fabric, wherein said yarns have a high extension range. This avoids the breaking of conducting fibres during the elastic action and, particularly, during the extension of the elastic fibres.

An other aspect of the invention is that the arrangement of the conducting fibres shaped as meshes, permits to make the conveyor belt with the fabric disposed in any way, for example in the direction of the weft, or in the direction of the warp.

Moreover each mesh of the conducting fibres is electrically connected with every other meshes. This permits to discharge the electricity in any condition the conveyor belt is working.

BRIEF DESCRIPTION OF THE DRAWINGS

However, it should be understood that the detailed description and specific example, while indicating preferred embodiments of the invention, are given by way of illustration only, since various changes and modifications within the spirit and scope of the invention will become apparent to those skilled in the art from this detailed description and from the drawings, wherein.

DESCRIPTION OF THE INVENTION

Figure 1:
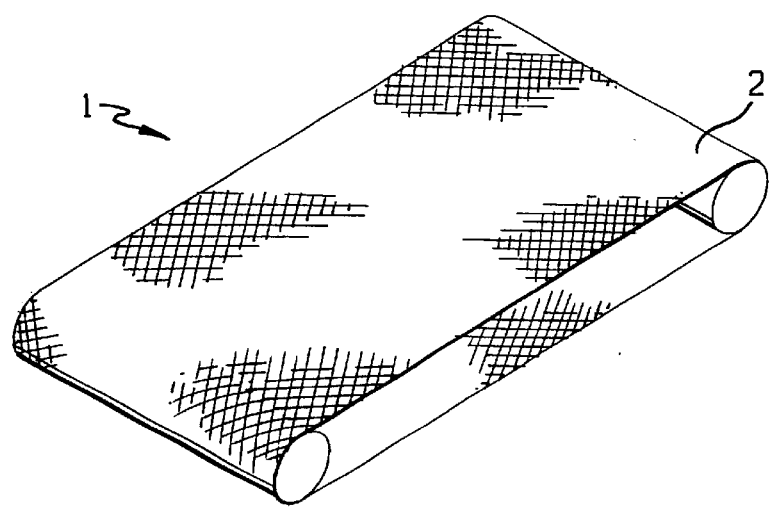
FIG. 1 shows a schematic drawing of a conveyor belt according to the invention.

The conveyor belt according to the invention is schematically represented in FIG. 1, wherein it is indicated as a whole with 1. The conveyor belt 1 is made of an elastic fabric 2, a part of which id shown in FIG. 2 and in FIG. 3, which represents an enlarged view of FIG. 2.

The elastic fabric of the conveyor belt is made of elastic fibres, preferably elastomeric fibres, like LYCRA® material (a Dupont registered trademark), which assures a very high elasticity modulus.

Figure 2:
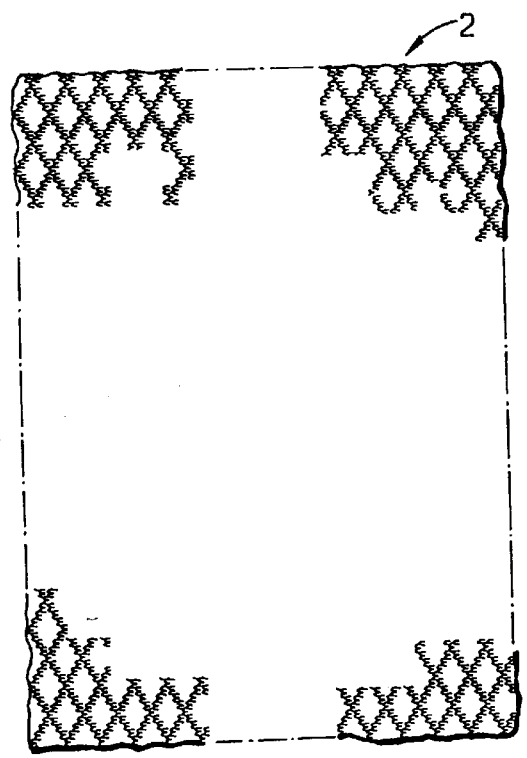
FIG. 2 shows a part of the fabric of the conveyor belt according to the invention.
Figure 3:
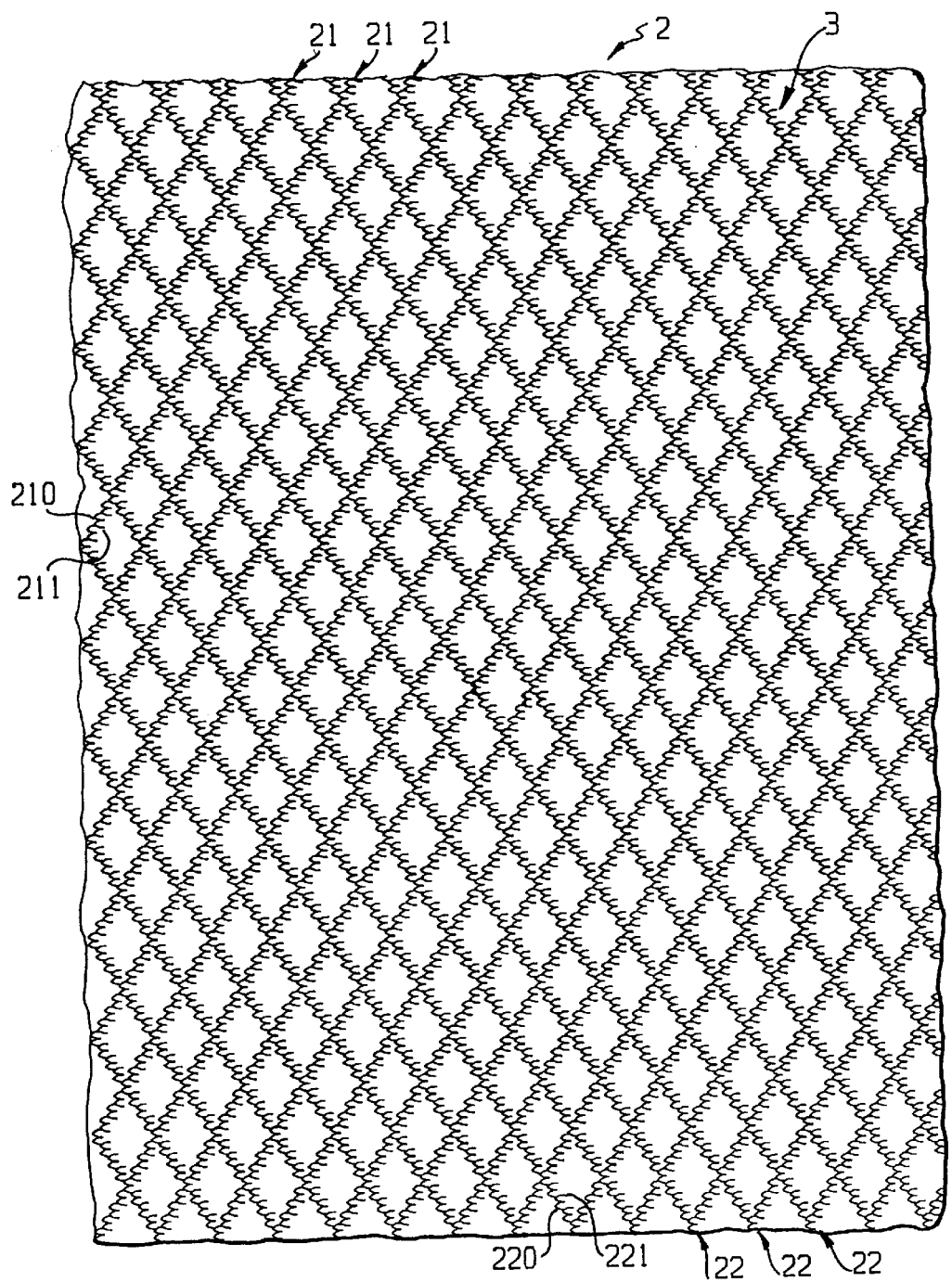
FIG. 3 shows an enlarged view of the fabric of FIG. 1.

As it can be seen in FIG. 2, and better in FIG. 3, the fabric 2 presents a first series of conductive lines 21 which cross with a second series of lines 22.

Each line 21 is made of two conductive fibres 210 and 211, such as fibres of carbon, copper or aluminium, where each one is wound around a fiber of weft or of warp of said elastic fabric.

The same happens to each line 22, each of them is made of two conductive fibres 201 and 221.

Depending on the needs, the conductive fibres of each line of the meshes may be one or two, or more than two.

The wounding of conductive fibres around the fibres of the fabric avoids the breaking of the conductive fibres during the extension of the elastic fibres, because the conductive fibres are made of materials, such as carbon, copper or the like, that are not extensible per se. Therefore the wounding of conductive fibres creates a sort of elastic effect which permits to follow the extension of the elastic fibres when the elastic conveyor belt of the invention is working, for example, in a perching machine that realizes the beating of tanned leather through perching units.

This kind of beating is made positioning the leather items like a sandwich, i.e. between two elastic conveyor belts that move in the same direction in a perching machine, substantially one in contact with the other, with the possibility of inserting leathers between the walls of said two conveyor belts in contact. Leather items inserted into this sandwich, are subjected to the action of beating on the part of perching units.

It is in this stage, according to the traditional technique and with the currently used conveyor belts, the static electricity caused by the friction between the elasticized fabric and the leather is generated and accumulated onto the leathers.

By providing, according to the invention, the conveyor belt with fibres of a conducting material such as, carbon, copper, aluminium, titanium, or any other conducting fibres, static electricity as soon as it is generated is directly discharged on the cylinders that drive the belt conveyors or on equipments added to this purpose.

These cylinders, like all other metallic mass, are electrically connected to the ground and then the static electricity is completely discharged on the ground. The crossed lines 21 and 22 of the conductive fibres form a plurality of meshes 3 which can be considered electric meshes electrically connected each other. This fact improves the quality of the discharging of static electricity because, in any moment, every mesh in contact with a part of leather can discharge the static electricity accumulated during the perching, being each mesh electrically connected to the ground though the contact with the cylinders driving the conveyor belt.

Thus all the problems connected with the accumulation of static electricity are completely eliminated.

One of the fields in which the conveyor belts of the invention are conveniently used is the field of the perching machines, where the static electricity is generated in very high quantity, due to the system with which the hides of leather are treated.

The conveyor belt according to the invention can be advantageously used in other industrial activities different from the tanning sector with the same advantages, because this invention actually eliminates the dangerous static electricity, dangerous both for the operators, and also for the possible deterioration of the manufactured articles that accumulate static electricity.

The invention has been described herein with reference to a particular embodiment thereof. It is to be understood that variations and modifications can be effected within the spirit and scope of the invention.

What is claimed is:

1. A conveyor belt having an outer surface comprising: elastic fabric having weft and warp directions and capable to discharge static electricity accumulated in said conveyor belt, said conveyor belt including, in the weft or in the wrap of said elastic fabric, elastic fibres of conducting material having portions thereof exposed at the outer surface for enabling the discharge of static electricity accumulated by the belt, wherein said elastic fibres form series of lines crossed in such a way to form a plurality of meshes electrically connected to each other and wherein the conveyor belt is elastic in at least in a direction transverse to the weft and warp directions.

2. The conveyor belt according to claim 1), wherein each conducting fibre is made elastic being helically wound around an elastic yarn of said elastic fabric.

3. The conveyor belt according to claim 1), wherein said plurality of meshes are electrically connected together.

4. The conveyor belt according to claim 1), wherein each line forming said meshes is made of one or more conductive fibres.

5. The conveyor belt according to claim 1), wherein said elastic fibres of conductive material are made of carbon.

6. The conveyor belt according to claim 1), wherein said elastic fibres of conductive material are made of copper.

7. The conveyor belt according to claim 1), wherein said elastic fibres of conductive material are made of aluminum.

\* \* \* \* \*